United States Patent
Fu et al.

(10) Patent No.: US 7,394,305 B2
(45) Date of Patent: Jul. 1, 2008

(54) HIGH-VOLTAGE PUMP SWITCHING CIRCUIT INCLUDING RAMP AND DISCHARGE

(75) Inventors: Zhijun Fu, Shanghai (CN); Jie Wu, Shanghai (CN)

(73) Assignee: Integrated Silicon Solution, Inc., San Jose, CA (US)

( * ) Notice: Subject to any disclaimer, the term of this patent is extended or adjusted under 35 U.S.C. 154(b) by 31 days.

(21) Appl. No.: 11/507,721

(22) Filed: Aug. 21, 2006

(65) Prior Publication Data

US 2008/0042733 A1    Feb. 21, 2008

(51) Int. Cl.
  *G05F 1/10* (2006.01)
(52) U.S. Cl. .................................. 327/538; 327/530
(58) Field of Classification Search ................. 327/530, 327/536, 537, 544
  See application file for complete search history.

(56) References Cited

U.S. PATENT DOCUMENTS

| | | | |
|---|---|---|---|
| 6,009,022 A * | 12/1999 | Lee et al. ............... | 365/189.09 |
| 6,515,903 B1 * | 2/2003 | Le et al. ................. | 365/185.18 |
| 6,774,709 B2 * | 8/2004 | Castaldo et al. ............ | 327/536 |
| 6,917,240 B2 * | 7/2005 | Trafton et al. .............. | 327/540 |
| 7,057,949 B1 * | 6/2006 | Pan et al. .................... | 365/203 |

\* cited by examiner

*Primary Examiner*—Dinh T. Le
(74) *Attorney, Agent, or Firm*—David E. Lovejoy

(57) ABSTRACT

A regulator for regulating the output from a high-voltage pump, Vpump, to provide a regulated load voltage, Vpp, to a load in MOSFET integrated circuits. The regulator includes a MOSFET switch which when enabled in a first state connects Vpp to the integrated circuit voltage level, Vcc, and which when disabled in a second state allows Vpp to be driven to levels greater than Vcc. The regulator includes a multipath control circuit for controlling the switch state and for controlling Vpp. A first current path, Iramp, controls the rise-time parameters of Vpp and a second current path, Idis, controls the fall-time parameters of Vpp. The rise-time parameters and the fall-time parameters are separately controlled.

20 Claims, 4 Drawing Sheets

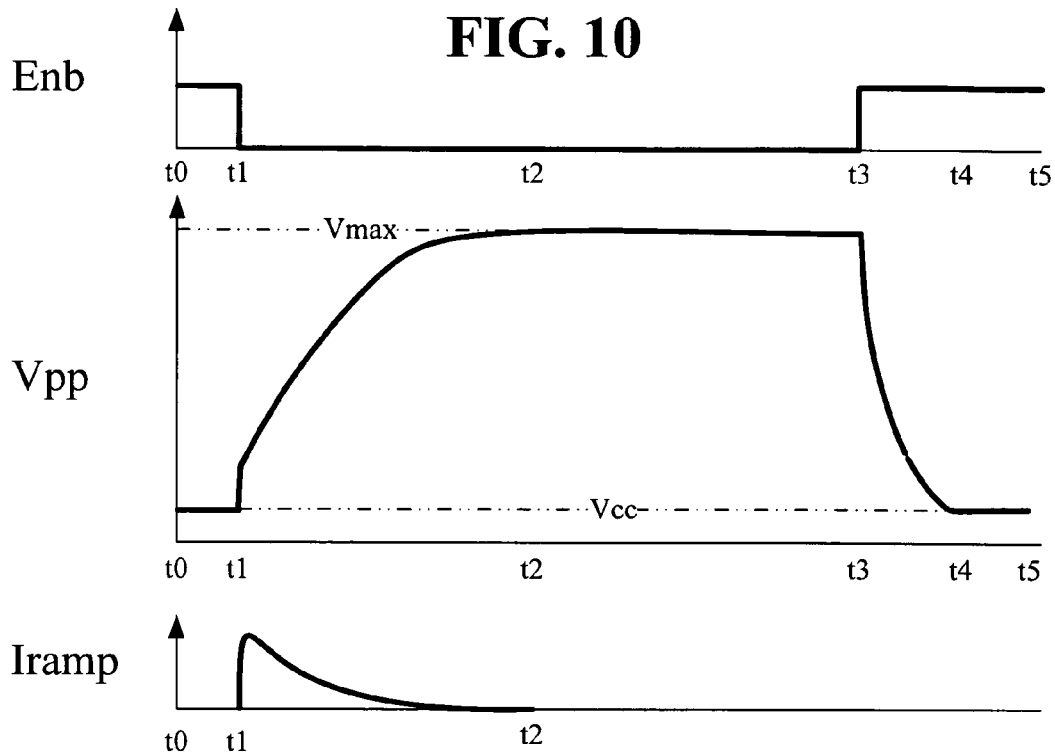
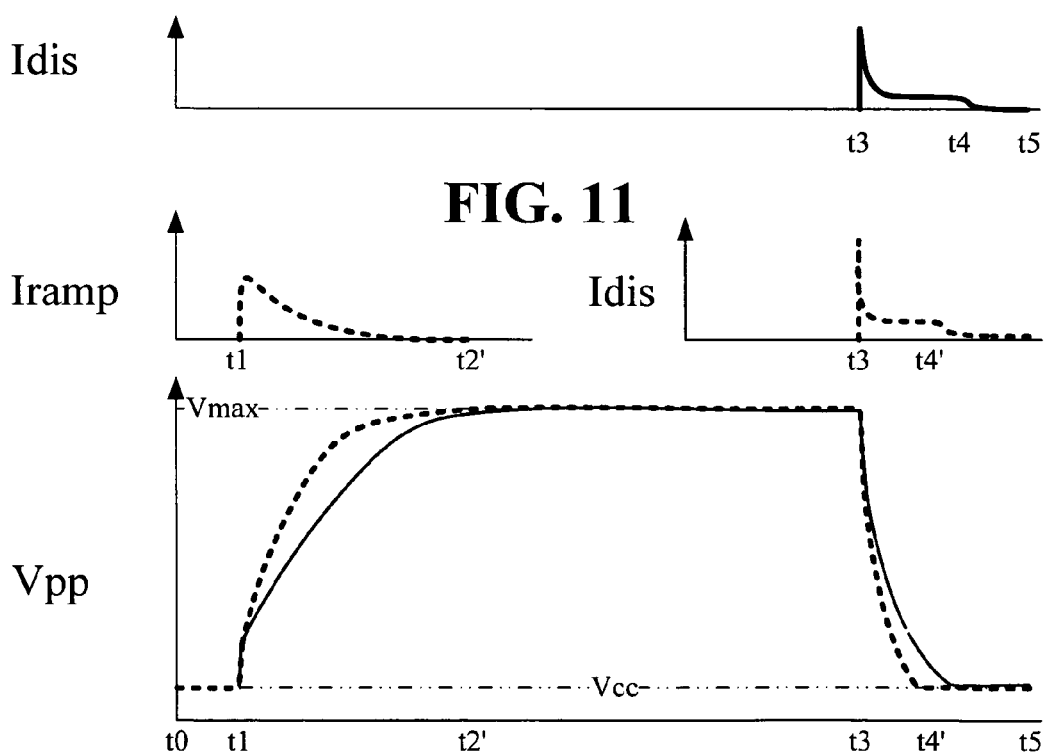

HIGH-VOLTAGE PUMP SWITCHING CIRCUIT INCLUDING RAMP AND DISCHARGE

TECHNICAL FIELD

The present invention relates to integrated circuits and more particularly to integrated circuits for controlling the generation of voltage levels with controlled rise and fall time parameters.

BACKGROUND OF THE INVENTION

On-chip high-voltage generation is important in integrated circuits and often employs Dickson-type voltage multiplier circuits known as high-voltage pumps. Such high-voltage pumps are used in integrated circuits to drive EEPROM cells, Flash cells, high-voltage switches, logic circuits and other loads.

In order for such loads to operate with high reliability, voltage levels from the high-voltage pumps need to be regulated to match the required rise and fall times and other parameters of the loads.

Digital technologies in many environments favor MOSFET technology because CMOS logic operates with no or low current and therefore no or low power consumption except when the inputs to logic gates are being switched. The standard building blocks for MOSFET technology are n-channel and p-channel transistors, identified as n-MOSFET and p-MOSFET transistors. The transistors have sources (S), drains (D) and gates (G) with gate-source voltage, Vgs, gate-drain voltage, Vgd, and the source-drain voltage, Vsd. The threshold voltage, Vt, is the voltage value that determines switching from one mode to another as determined by the internal structure of the transistor. In general, MOSFET technology operates in three modes, namely in triode, saturation and cutoff modes.

For an n-MOSFET transistor, the operation is as follows. In Triode mode, if Vgs>Vt and Vgd>Vt, then the n-channel is continuous all the way from S to D and form a conductor (or a resistor) of a given conductance (or resistance). The drain current increases if the voltage drop between S and D increases. The channel resistance depends on the quantity of charge injected at the S-end, which in turn is controlled by Vgs. The drain current, Id, depends on both Vgs and Vgd (or Vds). In Saturation mode, if Vgs>Vt and Vgd<Vt, then the n-channel is present (or induced) at the S-end, but the channel is depleted, pinched off, at the D-end. Once the D-end of the channel is pinched off, the current no longer depends on the voltage drop between S and D. In Cutoff mode, if Vgs<Vt (and Vgd<Vt), then no n-channel is present and there is no current.

For a p-MOSFET transistor, the operation is the same as for an n-MOSFET transistor as described in the previous paragraph except that the inequalities between Vgs and Vt and Vgd and Vt are reversed.

One prior art control circuit based upon MOSFET technology is shown herein in FIG. 2. The control circuit operates to control an input, G, at the gate of a MOSFET transistor where the transistor has a source-drain current path between the integrated circuit source voltage, Vcc, and the load voltage, Vpp. To regulate the voltage Vpump from the high-voltage pump, the control circuit of FIG. 2 must properly control the input, G, of the MOSFET transistor. Substantial difficulties have been encountered in the design of such control circuits because of the interaction between rise time, fall time and other parameters which are not easily controlled with a single control parameter G.

In light of the foregoing background, there is a need for improved circuits for regulating on-chip, integrated circuit, high-voltage generation and regulation, particularly for MOSFET integrated circuits.

SUMMARY OF THE INVENTION

The present invention is a regulator for regulating the output from a high-voltage pump to provide regulated voltage levels to a load in an integrated circuit. The regulator includes a switch which when enabled in a first state connects the load voltage level to the integrated circuit voltage level and which when disabled in a second state allows the load voltage level to be driven to levels greater than the integrated circuit voltage level. The regulator includes a multipath control circuit for controlling the switch state and for controlling the load voltage level. A first current path in the multipath control circuit controls the rise-time parameters of the load voltage and a second current path in the multipath control circuit controls the fall-time parameters of the load voltage. Since the rise-time parameters and the fall-time parameters are separately controlled, the regulator operates in an improved manner to regulate the load voltage level. Furthermore, changes in the design of the load voltage parameters in order to match the characteristics of different loads are more readily achieved.

The foregoing and other objects, features and advantages of the invention will be apparent from the following detailed description in conjunction with the drawings.

BRIEF DESCRIPTION OF THE DRAWINGS

FIG. 10 depicts a timing diagram representing the operation of the FIG. 8 regulator.

FIG. 11 depicts an alternate timing diagram representing the operation of the FIG. 8 regulator when the circuit parameters for Iramp and Idis have been modified to create different rise and fall parameters.

DETAILED DESCRIPTION

Figure 1:
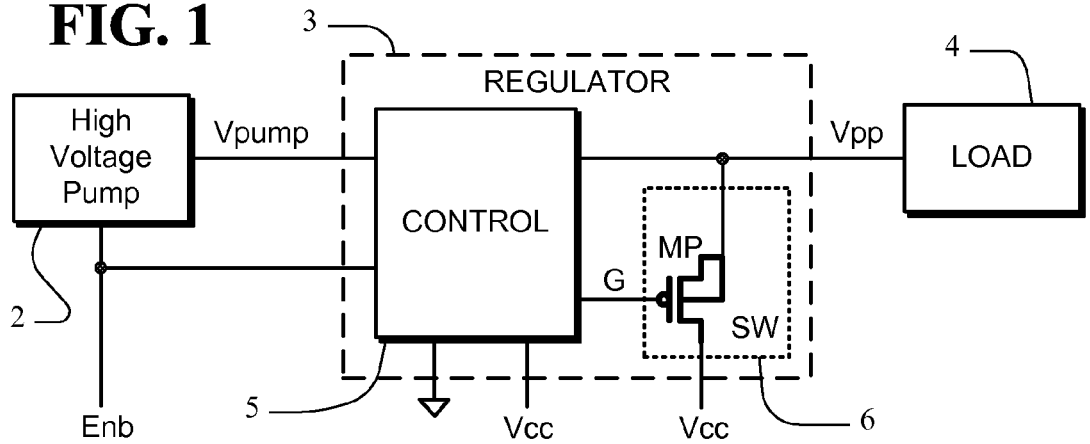
FIG. 1 depicts a circuit including a regulator, between a high-voltage pump and a load, for regulating load voltage supplied to the load.

In FIG. 1, a circuit including a regulator 3 for regulating the driving voltage, Vdr, between a high-voltage pump 2 and a load 4. The driving voltage, Vdr, includes the pump voltage, Vpump, output from the high-voltage pump 2 and the regulated load voltage, Vpp, connected to the load 4. Typically, all of the circuitry of FIG. 1 is part of a common integrated circuit (not explicitly shown). Also, the high-voltage pump 2 is typically a Dickson-type charge pump formed of circuits that use capacitors as energy storage elements to convert DC voltages of a low level such as the integrated circuit voltage level, Vcc, to higher levels that are required by load 4. The load 4 typically includes, for example, EEPROM cells, Flash cells, high-voltage switches and logic circuits.

The regulator 3 includes a switch 6 which, when enabled ON in a first state, provides a low impedance path connecting the load voltage level, Vpp, to the integrated circuit voltage level, Vcc. In the first state, Vpp equals Vcc. Switch 6 when disabled OFF in a second state, provides high impedance between Vpp and Vcc so that the load voltage level, Vpp, can be driven by pump 2 to levels greater than the integrated circuit voltage level, Vcc. The switch 6 is typically a p-channel MOSFET transistor, MP, with a source-drain connection between the load voltage, Vpp, and the circuit voltage level, Vcc, and with a switch gate for receiving the gate voltage G as a switch gate signal. The transistor, MP, is biased ON by the gate voltage G in the first state and is biased OFF by the gate voltage G in the second state.

The regulator 3 includes a control circuit 5 providing the gate voltage G for controlling the switch 6 and for controlling the load voltage level, Vpp. In the present invention, the control 5 includes multipath control circuits that independently control the rise-time parameters, the fall-time parameters and other parameters of the load voltage, Vpp, to match the requirements of the load 4.

Figure 2:
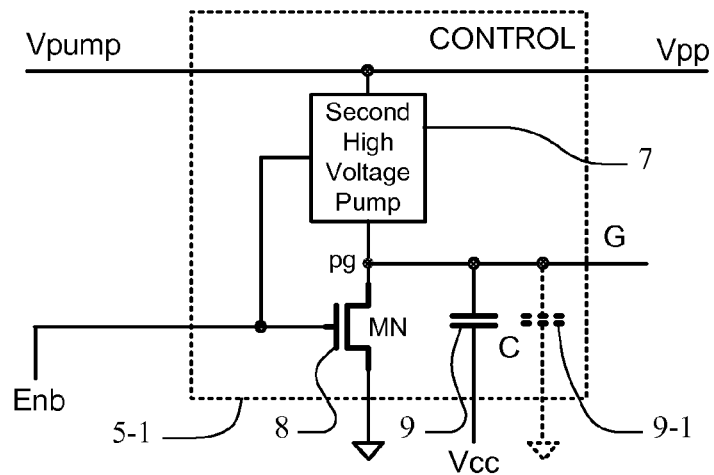
FIG. 2 depicts a prior art control circuit used in the regulator of FIG. 1.

In FIG. 2, the control circuit 5-1 is an example in the prior art typically used for control 5 in the regulator 3 of FIG. 1. The control circuit 5-1 in FIG. 2 includes a second high-voltage pump 7, an n-channel MOSFET (MN) transistor 8 and a loading capacitor (C) 9.

When the control circuit 5-1 is used in the regulator 3 of FIG. 1, the operation is as follows. The high-voltage pump 2 output node, Vpump, is at a high voltage when the enable pin, Enb, is enabled at "LOW" (typically LOW is defined as 0V). Alternately, the output node, Vpump, is at a high impedance when the high-voltage pump 2 is disabled. Typically, disabling is done by setting the Enb pin at "HIGH" ("HIGH" is typically defined at a voltage level equal to Vcc).

In FIG. 2, the second high-voltage pump 7 is also a Dickson type charge pump. The second high-voltage pump 7 typically works at a lower clock frequency than that of the first high-voltage pump 2. High-voltage pump 7 raises the voltage at the pg node to a value higher than Vpp when Enb is at LOW and outputs a high impedance when disabled when Enb is at High.

In FIG. 1 and FIG. 2, when Enb=High, Vpp=Vcc and Vcc supplies a load current Icc to the load 4 connected to Vpp. When Enb is switched to LOW, the high-voltage pump 2 begins to raise the value of Vpp and the second high-voltage pump 7 begins to raise the voltage at the pg node. If the Vpp voltage rises faster than permitted by the reliability requirements of load 4 (for example, faster than permitted by an EEPROM cell), the control 5-1 operates to slow down the rise rate of Vpp through generation of a ramp current, Iramp.

In operation of FIG. 1 and FIG. 2, the pg voltage is designed to rise slower than the rising rate of the Vpp voltage and hence the pg voltage typically is lower than the Vpp voltage. This difference between the Vpp voltage and the pg voltage results in the MP transistor 6 in FIG. 1 conducting the current, Iramp, to slow down the rising rate of Vpp. As the rising rate of Vpp is slowed down, pg will catch up with Vpp and eventually settle at a voltage level that turns off the MP transistor 6. The rising rate of the pg voltage is primarily controlled by the properties of the high-voltage pump 7 and the capacitance value of the capacitor 9. These properties are chosen to control the rising rate of the Vpp voltage to match the rate required by the load 4.

In FIG. 2 when high-voltage pump 7 is disabled (shut-off) by Enb=High, the MN transistor is ON and pulls down the pg node and the output G to LOW. With G LOW, the MP transistor of switch 6 in FIG. 1 is ON and discharges Vpp to Vcc with a discharge current Idis. The rate of the discharge current Idis is primarily controlled by the MN transistor conductance and the capacitance of the capacitor 9.

In the combination of FIG. 1 and FIG. 2, the rise and fall times of the load voltage Vpp are controlled by a current through the MP transistor switch 6 which is in turn regulated by the gate voltage G. The voltage G, however, is controlled by charging and discharging through the same capacitor 9 and hence it is difficult to independently control the rise and fall times of Vpp.

Figure 3:
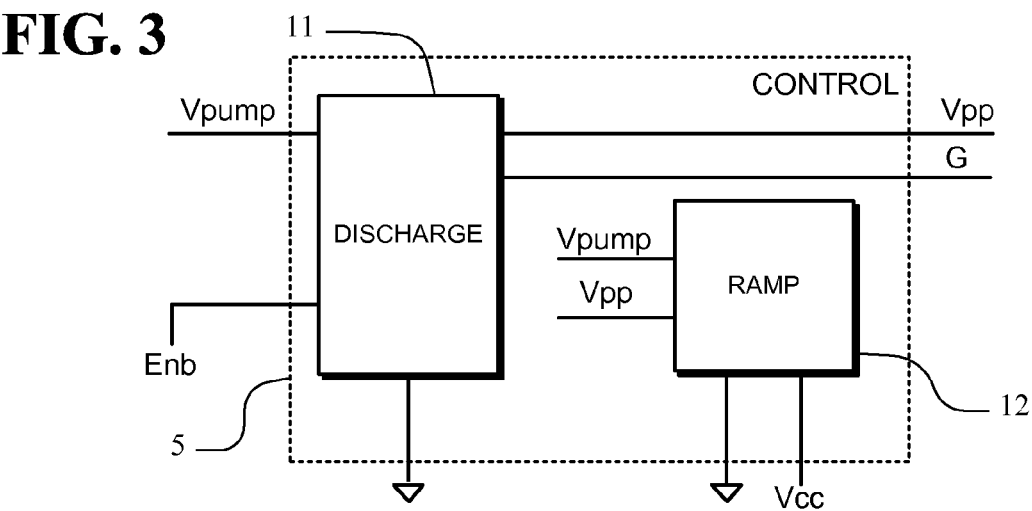
FIG. 3 depicts a multipath control unit, including a discharge unit and a ramp unit, used in the regulator of FIG. 1.

In FIG. 3, details of the control 5 of FIG. 1 are shown in accordance with the present invention. The control 5 includes a discharge unit 111 separate from a ramp unit 12 and these units separately control the fall and rise parameters of the load voltage Vpp. The discharge unit 11 provides a separate discharge current path, Idis, and the ramp unit 12 provides a separate ramp current path, Iramp. Since the rise-time parameters and the fall-time parameters are separately controlled in different current paths, the regulator 3 in FIG. 1 with the control 5 of FIG. 3 operates in an improved manner to regulate the load voltage level, Vpp.

Figure 4:
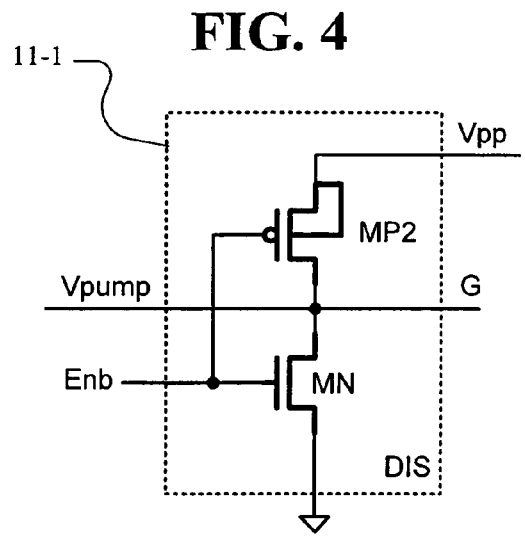
FIG. 4 depicts a circuit that is one embodiment of the discharge unit that provides the discharge current path in the control of FIG. 3.

In FIG. 4, the discharge unit 11-1 is one example of the discharge unit 11 of FIG. 3. In FIG. 4, a first discharge transistor is a p-channel MOSFET (MP2) transistor source-drain connected between Vpp and a Vpump node (G). The first discharge transistor MP2 has a first discharge gate connected to receive a first discharge gate signal. In FIG. 4, the first discharge gate signal for MP2 is the Enb signal. In FIG. 4, a second discharge transistor is an n-channel MOSFET (MN) transistor source-drain connected between the Vpump node (G) and ground. The second discharge transistor MN has a second discharge gate connected to receive a second discharge gate signal. In FIG. 4, the second discharge gate signal for MN is the Enb signal. During the discharge operation, the first and second discharge transistors MP2 and MN are both ON by operation of the HIGH for the Enb gate signal. During the discharge operation, the MP2 transistor and the MN transistor conduct the discharge current, Idis, from Vpp to ground.

Figure 5:
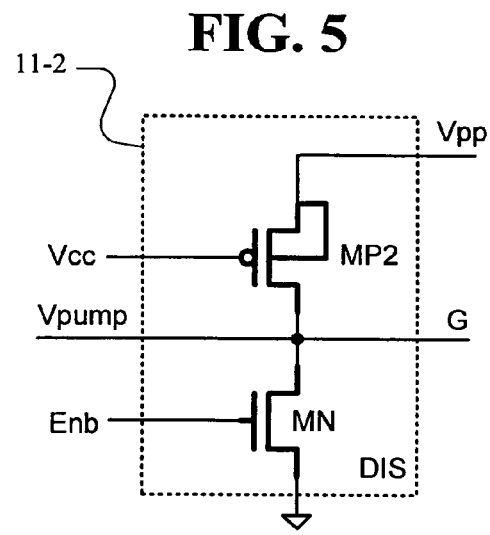
FIG. 5 depicts a circuit that is another embodiment of the discharge unit that provides the discharge current path in the control of FIG. 3.

In FIG. 5, the discharge unit 11-2 is another example of the discharge unit 11 of FIG. 3. In FIG. 5, a first discharge transistor is a p-channel MOSFET (MP2) transistor source-drain connected between Vpp and a Vpump node (G). The first discharge transistor MP2 has a first discharge gate connected to receive a discharge gate voltage. In FIG. 5, the first discharge gate voltage for MP2 is the Vcc circuit voltage. In FIG. 5, a second discharge transistor is an n-channel MOSFET (MN) transistor source-drain connected between the Vpump node (G) and ground. The second discharge transistor MN has a second discharge gate connected to receive the Enb signal. During the discharge operation, the MP2 transistor is ON by operation of the HIGH for the Enb gate signal and the MN transistor is ON by operation of the Vcc gate level.

In FIG. 4 and FIG. 5 during the discharge operation, the MP2 transistor and the MN transistor conduct the discharge current, Idis, from Vpp to ground. The parameters of the discharge current, Idis, are controlled by the conductance parameters of the MP2 transistor and the MN transistor. Typically, the MN transistor is designed to control the discharge rate of Vpp for meeting a specific design requirement for the particular load 4 of FIG. 1. For example, the MN transistor is designed with a lower conductance for a slower discharge rate and is designed with a higher conductance for a higher discharge rate.

Figure 6:
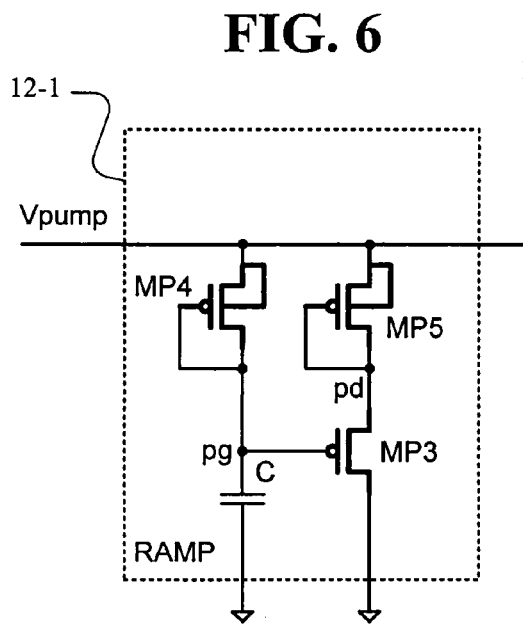
FIG. 6 depicts a circuit that is one embodiment of the ramp circuit, for providing the ramp current path, in the control of FIG. 3.

In FIG. 6, the ramp circuit 12-1 is one embodiment of the ramp unit 12 of FIG. 3. In FIG. 6, a first p-channel MOSFET (MP5) transistor, in a diode-connected configuration, is connected in series through a node pd to a second p-channel MOSFET (MP3) transistor to provide a controlled current path between Vpump and ground. The current path through the first and second ramp transistors MP5 and MP3 conducts the Iramp current between Vpump and ground. The transistor MP3 is regulated by the voltage, Vpg, at node pg. The node pg is located between the capacitor-feed transistor MP4 and capacitor C. The transistor MP4 is a p-channel MOSFET transistor, in a diode-connected configuration source-drain connected to capacitor C. As Vpump rises, MP4 conducts a capacitor current that charges capacitor C with a voltage producing a capacitor voltage, Vpg, at node pg that tends to follow the rise in Vpump with a off-set due to the drop across MP4. Similarly, as Vpump rises, MP5 conducts a ramp current, Iramp, through MP3 producing a voltage, Vpd, at node pd that tends to follow the rise in Vpump with a small off-set due to the drop across MP5.

After the voltage of node Vpump of FIG. 6 settles to a level controlled by the output of the high-voltage pump 2 of FIG. 1, the voltage of node pg settles to a voltage that is a threshold voltage (Vt) for a p-channel device, Vtp, lower than Vpump. Similarly, the voltage of node pd settles to a voltage that is Vtp lower than Vpump and hence is the same voltage level as at node pg, thus turning MP3 OFF and terminating the current, Iramp.

Figure 7:
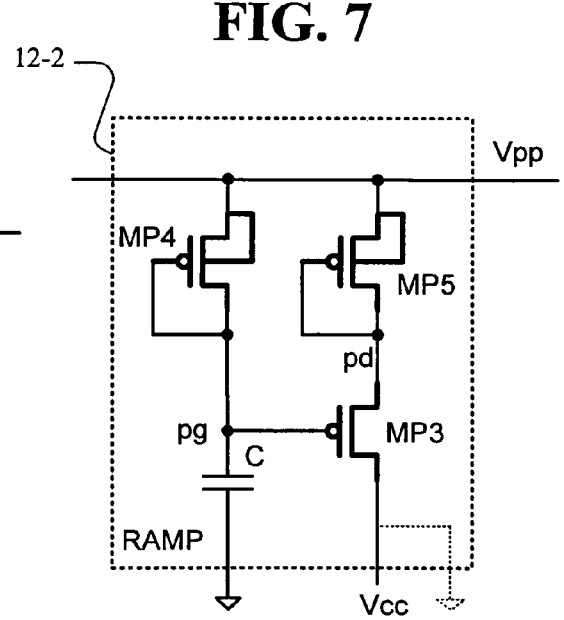
FIG. 7 depicts a circuit that is another embodiment of the ramp circuit, for providing the ramp current path, in the control of FIG. 3.

In FIG. 7, the ramp circuit 12-2 is another embodiment of the ramp unit 12 of FIG. 3 and differs from the FIG. 6 embodiment in that connection is made to Vpp rather than to Vpump. In FIG. 7, a first p-channel MOSFET (MP5) transistor, in a diode-connected configuration, is connected in series through a node pd to a second p-channel MOSFET (MP3) transistor to provide a controlled current path between Vpp and a reference voltage which is Vcc or in an alternate embodiment is ground (shown dotted line). The current path through first and second ramp transistors MP5 and MP3 conducts the Iramp current between Vpp and Vcc or ground. The transistor MP3 is regulated by the voltage at node pg. The node pg is located between the transistor MP4 and capacitor C. The transistor MP4 is a p-channel MOSFET transistor, in a diode-connected configuration source-drain connected to capacitor C. As Vpp rises, MP4 conducts a charging current that charges capacitor C with a voltage producing a capacitor voltage, Vpg, at node pg that tends to follow the rise in Vpp with an off-set due to the drop across MP4. Similarly, as Vpp rises, MP5 conducts a ramp current, Iramp, through MP3 producing a voltage, Vpd, at node pd that tends to follow the rise in Vpp with a small off-set due to the drop across MP5.

After the voltage of node Vpp of FIG. 7 settles to a level controlled by the output of the high-voltage pump 2 of FIG. 1, the voltage of node pg settles to a voltage that is an off-set, Vtp, lower than Vpp. Similarly, the voltage of node pd settles to a voltage that is an off-set, Vtp, lower than Vpp and hence is the same voltage level as at node pg, thus turning MP3 OFF and stopping the balancing action during ramping by terminating the current, Iramp.

The similar circuit configurations of MP5 and MP3 in FIG. 6 and FIG. 7 provide a controlled current path for Iramp so that Iramp tends to be constant before MP3 is turned OFF to terminate Iramp.

Figure 8:
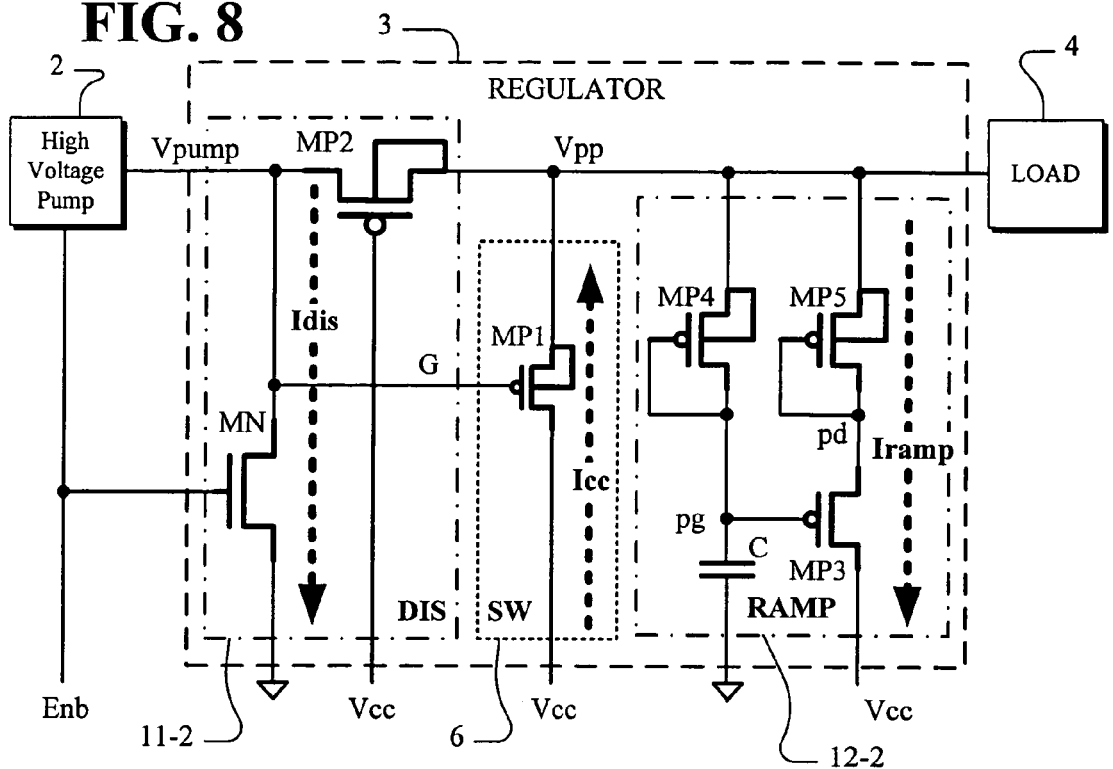
FIG. 8 depicts the circuit of FIG. 1 including a first embodiment of a regulator for regulating the output from a high-voltage pump to provide regulated voltage levels to a load where the regulator includes the discharge circuit of FIG. 5 and includes the ramp circuit of FIG. 7.

FIG. 8 provides one embodiment of present invention having a transistor MP1 switch 6 between the load voltage, Vpp, and low voltage power supply, Vcc, and having a discharge unit 11-2 of FIG. 5 and ramp unit 12-2 of FIG. 7.

In FIG. 8, a driving voltage, Vdr, is provided to drive the load 4. The driving voltage includes the pump voltage, Vpump, and the load voltage, Vpp. The regulator 3 of FIG. 1 regulates the pump voltage, Vpump, output from the high-voltage pump 2 to provide the regulated load voltage, Vpp, to load 4. The regulator 3 of FIG. 8 includes the discharge circuit 11-2 of FIG. 5 and includes the ramp circuit 12-2 of FIG. 7. With this configuration, the load current, Icc, through MP1, the Iramp current through ramp unit 12-2 and the discharge current, Idis, through discharge unit 11-2 each are designed and adjusted separately and independently. Further, the design avoids large spikes in Iramp and/or Idis and this avoidance is particularly desirable in wireless and other applications.

In FIG. 8, MP1, which conducts the Icc current for the load when the high-voltage pump 2 is disabled, does not conduct the Iramp current or the Idis current. This condition results because whenever Vpump is higher than Vcc, MP1 is biased OFF. MP1 and MP2 are a pair of cross-connected p-channel MOSFETs, wherein the gate of MP1 is connected to the drain of MP2 and the gate of MP2 is connected to the drain of MP1. The cross-connected MP1 and MP2 MOSFETS provide that one MOSFET is ON while the other MOSFET is OFF. Such cross-connected architecture decouples the current paths for Idis and Icc.

In FIG. 8, at a time when the input control signal Enb is HIGH, the high-voltage pump 2 is disabled and provides Vpump at 0 volts so that MP1 is in a conduction state and the voltage Vpp equals that of Vcc. The voltage Vpp through transistor MP1, when transistor MP1 is in the conducting state, is equal to Vcc and Vpp=Vcc is applied to load 4 to cause the load current, Icc. With Vpump at 0, MP2 is shut OFF so there is no Idis current when the Icc current is present. Since capacitor voltage Vpg at capacitor node pg is more positive than Vpp, capacitor-feed transistor MP4 is OFF and conducts no dc current. The voltage Vpg of node pg is not Vtp lower than that of Vpp, so that MP3 is OFF and MP3 and MP5 do not conduct Iramp current. Accordingly, there is no Iramp current when the load current Icc is present.

In FIG. 8, operation is analyzed when the input control signal Enb is switched to LOW and the high-voltage pump 2 becomes enabled. When the input control signal Enb is switched to LOW, the voltage Vpump begins to rise and exceed the Vcc voltage level. In response, MP2 turns ON and the voltage Vpp follows Vpump and MP1 turns OFF. During the rise of Vpp, capacitor-feed transistor MP4 turns ON to charge capacitor C with a capacitor current and the voltage, Vpg, of capacitor node pg rises at the same rate as the rise in Vpp. The rate of the rise of Vpp is designed to satisfy the requirements of the load 4. The rate of the rise of Vpp is controlled by the voltage difference between Vpp and Vpg at capacitor node pg. As the voltage difference between Vpp and Vpg at node pg grows, MP3 is turned ON to control the current Iramp through MP3 and MP5. The current Iramp slows down the rising rate of Vpp. As the voltage Vpp settles to a desired level, MP4 stops conducting dc capacitor current so the voltage Vpg of node pg is not Vtp lower than that of Vpp and MP3 becomes turned OFF. With MP3 turned OFF, MP3 and MP5 do not conduct any current Iramp.

In order to control the rise of Vpp to be satisfactory for the requirements of the load 4, the parameters of the ramp circuitry 12-2 of control unit 5 are modifiable. By changing the parameters of the ramp circuitry 12-2, the current Iramp and the rise rate of Vpp are controlled.

During ramping, the ramping rate dVpump/dt for Vpump and the ramping rate dVpp/dt for Vpp equal the ramping rate dVpg/dt for Vpg. The voltages Vpump and Vpp are collectively the driving voltage, Vdr, and therefore, the ramping rate dVdr/dt is equal to the ramping rate, dVpg/dt, for Vpg. Further, a voltage difference ΔV1 between Vpump, Vpp or Vdr and Vpg can be expressed to a first order in following equation:

$$\Delta V1 = Vtp - [\{dVpg/dt\}\{C/(K \cdot S)\}]^{1/2} \quad \text{Eq (1)}$$

where,
Vtp=threshold voltage of p-channel transistor MP4
C=capacitance for the capacitor C
S=the width to length ratio of MP4
K=the transconductance parameter of MP4
dVpg/dt=ramping rate Eq (1) indicates that ΔV1 is proportional to the square root of a product of the ramping rate (dVpg/dt) and a multiplication constant C/(K·S). Therefore, the larger the multiplication constant, the larger the voltage difference ΔV1. Usually, it is desirable to maximize ΔV1 by maximizing the multiplication constant. This maximizing can be done by maximizing C, or by minimizing K or S. A larger C is more desirable as a larger Iramp can be achieved for better controlling the ramping rate.

In FIG. 8, operation is analyzed when the input control signal Enb is switched to HIGH and the high-voltage pump 2 becomes disabled. When the input control signal Enb is switched to HIGH, transistor MN turns ON to discharge capacitors coupled to lines Vpump and Vpp and thereby allow Vpp and Vpump to fall. As long as the voltage of Vpp is higher than that of Vcc by a threshold amount of Vtp, MP2 is ON. The conductance of MP2 is designed to be larger than the conductance of MN so that the voltage difference between Vpump and Vpp is small and MP1 remains biased OFF during the discharge period. The discharge current path for Idis, therefore, is through MP2 and MN. After voltage of Vpp falls below the threshold Vcc+Vtp, MP2 turns OFF and MN continues to draw the voltage of Vpump to LOW. When Vpump is LOW, MP1 turns ON to sink all the remaining charges on Vpp and Vpp falls to Vcc. During the period when Vpp is falling, the voltage of node pg follows Vpp, with an off-set voltage higher due to the drop across the pn junction of MP4. Therefore, during the period when Vpp is falling, Vpg remains higher than Vpd and thus MP3 and MP5 remain OFF.

In order to control the fall of Vpp to be satisfactory for the requirements of the load 4, the parameters of the discharge circuitry 11-2 of control unit 5 are modifiable. By changing the parameters of the discharge circuitry 11-2, the current Idis and the fall rate of Vpp are controlled. In FIG. 8, the rate of fall of Idis is determined in part by the conductance of MN and modifying the conductance of MN is used to modify the discharge rate of Vpp.

In summary, FIG. 8 includes a regulator 3 for controlling a pump voltage, Vpump, from a high-voltage pump 2 to form a regulated load voltage, Vpp, for a load 4. The pump voltage provides a rising load voltage during a rise time when the high-voltage pump 2 is enabled by an enable signal, Enb, and a falling load voltage during a fall time when said high-voltage pump is disabled by said enable signal, Enb. The switch 6 connects between the load voltage, Vpp, and a circuit voltage, Vcc. The switch 6 has a switch gate, G, for receiving a gate signal for controlling conduction by the switch 6. A control circuit provides the gate signal. The control circuit includes a ramp unit 12-2 providing a ramp current, Iramp, for controlling the rising load voltage during said rise time. The control circuit includes a discharge unit 11-2 for controlling the falling load voltage during said fall time. The discharge unit 11-2 and the ramp unit 12-2 operate independently to independently control the rising load voltage and the falling load voltage.

In further summary of FIG. 8, the ramp unit 12-2 includes source-drain connected first and second ramp transistors MP5 and MP3 connected at a ramp node, pd, for conducting a ramp current, Iramp, where the second ramp transistor MP3 includes a ramp gate for controlling the ramp current through the second ramp transistor MP3 includes a capacitor-feed transistor MP4 having a source-drain connection to a capacitor node, pg, for conducting capacitor current for controlling the voltage stored on a capacitor C, the capacitor node pg connected to the ramp gate for controlling the ramp current. The discharge unit includes source-drain connected first and second discharge transistors MP2 and MPN, connected at a switch node, G, for conducting a discharge current where the switch node G is connected to the switch gate and provides the gate signal for controlling conduction by the switch. The first and second discharge transistors MP2 and MPN have first and second gates, respectively, said first gate connected to receive the circuit voltage, Vcc, and said second gate connected to receive the enable signal, Enb.

Figure 9:
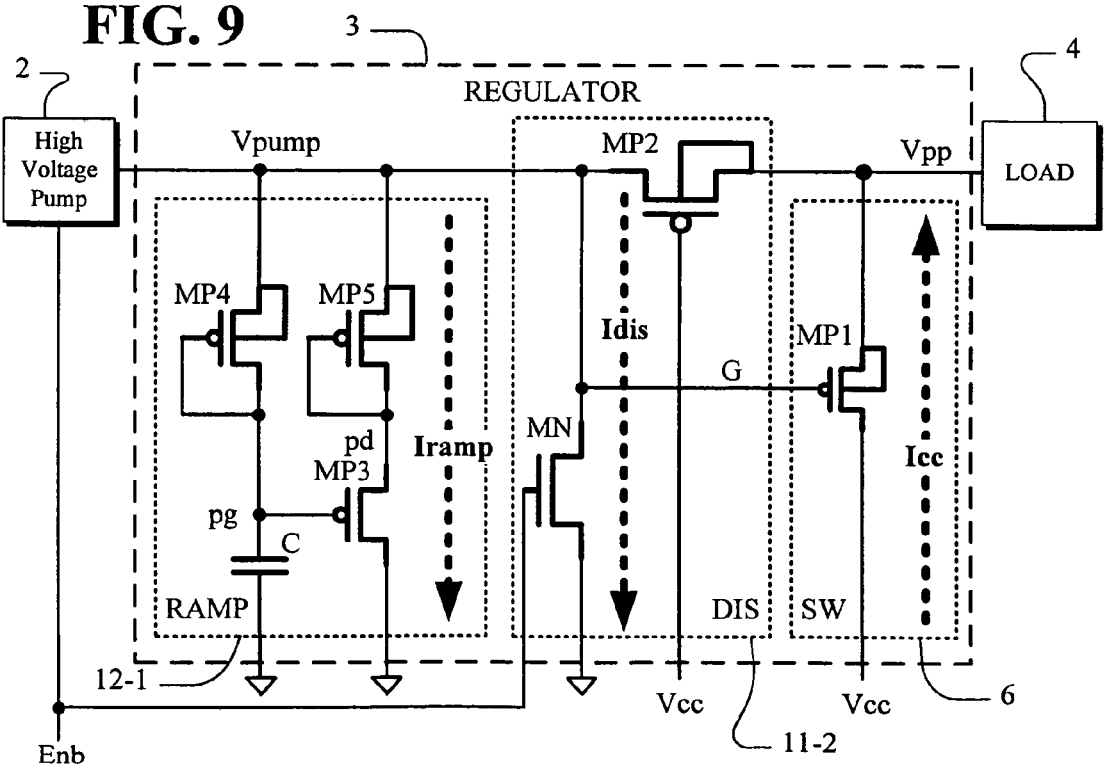
FIG. 9 depicts the circuit of FIG. 1 including another embodiment of a regulator for regulating the output from a high-voltage pump to provide regulated voltage levels to a load where the regulator includes the discharge circuit of FIG. 5 and includes the ramp circuit of FIG. 6.

In FIG. 9, the regulator 3 of FIG. 1 regulates the output from the high-voltage pump 2 to provide regulated voltage levels Vpp to load 4. The regulator 3 of FIG. 9 includes the discharge circuit 11-2 of FIG. 5 and includes the ramp circuit 12-1 of FIG. 6. With this configuration, the load current, Icc, through MP1, the Iramp current through ramp unit 12-1 and the discharge current, Idis, through discharge unit 11-2 each are designed and adjusted separately and independently. Further, the design avoids large spikes in Iramp and/or Idis and this avoidance is particularly desirable in wireless and other applications.

In FIG. 9, MP1, which conducts the Icc current for the load when the high-voltage pump 2 is disabled, does not conduct the Iramp current or the Idis current. This condition results because whenever Vpump is higher than Vcc, MP1 is biased OFF.

FIG. 9 provides one embodiment of present invention having a transistor MP1 switch 6 between the load voltage, Vpp, and low voltage power supply, Vcc, and having a discharge unit 11-2 of FIG. 5 and ramp unit 12-1 of FIG. 6.

In FIG. 9, at a time when the input control signal Enb is HIGH, the high-voltage pump 2 is disabled and provides Vpump at 0 volts so that MP1 is in a conduction state and the voltage Vpp equals that of Vcc. The voltage Vpp through transistor MP1, when transistor MP1 is in the conducting state, is equal to Vcc and Vpp=Vcc is applied to load 4 to cause the load current, Icc. With the Vpump at 0, MP2 is shut OFF so there is no Idis current when the Icc current is present. Since voltage Vpg at node pg is more positive than Vpump, MP4 is OFF and conducts no dc current. The voltage Vpg of node pg is not Vtp lower than that of Vpump, so that MP3 is OFF and MP3 and MP5 do not conduct Iramp current. Accordingly, there is no Iramp current when the load current Icc is present.

In FIG. 9, operation is analyzed when the input control signal Enb is switched to LOW and the high-voltage pump 2 becomes enabled. When the input control signal Enb is switched to LOW, the voltage Vpump begins to rise and exceed the Vcc voltage level. In response, MP2 turns ON and the voltage Vpp follows Vpump and MP1 turns OFF. During the rise of Vpp, MP4 turns ON to charge capacitor C and the voltage of node pg rises at the same rate as the rise in Vpp. The rate of the rise of Vpp is designed to satisfy the requirements of the load 4. The rate of the rise of Vpp is controlled by the voltage difference between Vpp and node pg. As the voltage difference between Vpp and node pg grows, MP3 is turned ON to control the current Iramp through MP3 and MP5. The current Iramp slows down the rising rate of Vpp. As the voltage Vpp settles to a desired level, MP4 stops conducting dc current so the voltage of node pg is not Vtp lower than that of Vpp and MP3 becomes turned OFF. With MP3 turned OFF, MP3 and MP5 do not conduct any current Iramp.

In order to control the rise of Vpp to be satisfactory for the requirements of the load 4, the parameters of the ramp circuitry 12-1 of control unit 5 are modifiable. By changing the parameters of the ramp circuitry 12-1, the current Iramp and the rise rate of Vpp are controlled.

During ramping, the ramping rate dVpump/dt for Vpump and the ramping rate dVpp/dt for Vpp equal the ramping rate dVpg/dt for Vpg. Further, a voltage difference $\Delta V1$ between Vpump and Vpg are expressed to first order by equation Eq (1) above.

Eq (1) indicates that $\Delta V1$ is proportional to the square root of a product of the pump ramping rate (dVpump/dt) and a multiplication constant C/(K·S). Therefore, the larger the multiplication constant, the larger the voltage difference $\Delta V1$. Usually, it is desirable to maximize $\Delta V1$ by maximizing the multiplication constant. This maximizing can be done by maximizing C, or by minimizing K or S. A larger C is more desirable as a larger Iramp can be achieved for better controlling the ramping rate.

In FIG. 9, operation is analyzed when the input control signal Enb is switched to HIGH and the high-voltage pump 2 becomes disabled. When the input control signal Enb is switched to HIGH, transistor MN turns ON to discharge capacitors coupled to lines Vpump and Vpp and thereby allow Vpp and Vpump to fall. As long as the voltage of Vpp is higher than that of Vcc by a threshold amount of Vtp, MP2 is ON. The conductance of MP2 is designed to be larger than the conductance of MN so that the voltage difference between Vpump and Vpp is small and MP1 remains biased OFF during the discharge period. The discharge current path for Idis, therefore, is through MP2 and MN. After voltage of Vpp falls below the threshold Vcc+Vtp, MP2 turns OFF and MN continues to draw the voltage of Vpump to LOW. When Vpump is LOW, MP1 turns ON to sink all the remaining charges on Vpp and Vpp falls to Vcc. During the period when Vpump is falling, the voltage of node pg follows Vpump, with an off-set voltage higher due to the drop across the pn junction of MP4. Therefore, during the period when Vpump is falling, Vpg remains higher than Vpd and thus MP3 and MP5 remain OFF.

In order to control the fall of Vpp to be satisfactory for the requirements of the load 4, the parameters of the discharge circuitry 11-2 of control unit 5 are modifiable. By changing the parameters of the discharge circuitry 11-2, the current Idis and the fall rate of Vpp are controlled. In FIG. 9, the rate of fall of Idis is determined in part by the conductance of MN and modifying the conductance of MN is used to modify the discharge rate of Vpp.

In FIG. 10, the timing diagram represents the operation of the circuit of FIG. 8. At time t0, the Enb signal has been HIGH for some time and the load voltage is settled at Vcc. At t1, the Enb signal is switched to LOW causing a responsive jump in Vpp which rises toward Vmax which is reached at about t2. At t1, the ramp current, Iramp, starts conducting and slows the rise rate of Vpp up to Vmax at t2. After t2, the Enb signal remains LOW and Vpp remains essentially constant until t3. At t3, the Enb signal is switched to HIGH causing a responsive drop in Vpp toward Vcc which is reached at about t4. At t3, the discharge current, Idis, starts conducting and controls the fall rate of Vpp until Vpp reaches Vcc at about t4. After t4, Idis continues to conduct until about t5 allowing Vpump (not shown in FIG. 10) to drop to 0V.

In FIG. 11, the timing diagram represents the operation of the circuit of FIG. 8 with parameters changed to change Iramp and Idis and thus to change the rise time and the fall time of the load voltage, Vpp. At time t0, the Enb signal has been HIGH for some time and the load voltage, Vpp (shown as a dashed line in FIG. 11 and superimposed over the solid line of FIG. 10), is settled at Vcc. At t1, the Enb signal is switched to LOW causing a responsive jump in Vpp which rises toward Vmax which is reached at about t2' (earlier than t2 of FIG. 10). In FIG. 11 at t1, a ramp current, Iramp' (similar to Iramp in FIG. 10 but with different parameters including lower peak amplitude), starts conducting and slows the rise rate of Vpp up to Vmax at t2'. After t2', the Enb signal remains LOW and Vpp remains essentially constant until t3. At t3, the Enb signal is switched to HIGH causing a responsive drop in Vpp toward Vcc which is reached at about t4' (earlier than t4 of FIG. 10). In FIG. 11 at t3, the discharge current, Idis, starts conducting and controls the fall rate of Vpp until Vpp reaches Vcc at about t4'. After t4', Idis (similar to Idis in FIG. 10 but with different parameters including a higher peak amplitude) continues to conduct until about t5 allowing Vpump (not shown in FIG. 11) to drop to 0V.

While the invention has been particularly shown and described with reference to preferred embodiments thereof it will be understood by those skilled in the art that various changes in form and details may be made therein without departing from the scope of the invention.

The invention claimed is:

1. A regulator, connected to regulator voltages including a pump voltage from a high-voltage pump and a load voltage for a load, for controlling the pump voltage to form the load voltage, said pump voltage providing a rising load voltage during a rise time when said high-voltage pump is enabled by an enable signal and a falling load voltage during a fall time when said high-voltage pump is disabled by said enable signal comprising:

a switch connected between the load voltage and a circuit voltage and having a switch gate for receiving a gate signal for controlling conduction by said switch, a control circuit for providing said gate signal, said control circuit including, a ramp unit, connected between a regulator voltage and ground, providing a ramp current for controlling the rising load voltage during said rise time, a discharge unit, connected between the load voltage and the circuit voltage, for controlling the falling load voltage during said fall time, wherein said discharge unit and said ramp unit operate independently to independently control the rising load voltage and the falling load voltage.

2. The regulator of claim 1 wherein each of said switch, said ramp unit, said discharge unit, said high-voltage pump and said load include MOSFETs.

3. The regulator of claim 1 wherein,
said ramp unit includes source-drain connected first and second ramp transistors connected at a ramp node for conducting a ramp current where said second ramp transistor includes a ramp gate for controlling the ramp current through said second ramp transistor, includes a capacitor-feed transistor having a source-drain connection to a capacitor node for conducting capacitor current for controlling the voltage stored on a capacitor, said capacitor node connected to said ramp gate for controlling the ramp current,
said discharge unit includes source-drain connected first and second discharge transistors, connected at a switch node, for conducting a discharge current where said switch node is connected to said switch gate and provides said gate signal for controlling conduction by said switch.

4. The regulator of claim 3 wherein said first and second ramp transistors connect between the pump voltage and ground.

5. The regulator of claim 3 wherein said first and second ramp transistors connect between the load voltage and the circuit voltage.

6. The regulator of claim 3 wherein said first and second ramp transistors connect between the load voltage and ground.

7. The regulator of claim 3 wherein said first and second discharge transistors connect between the load voltage and ground and wherein said first and second discharge transistors have first and second gates, respectively, each connected to receive the enable signal.

8. The regulator of claim 3 wherein said first and second discharge transistors connect between the load voltage and ground and wherein said first and second discharge transistors have first and second gates, respectively, said first gate connected to receive the circuit voltage and said second gate connected to receive the enable signal.

9. The regulator of claim 3 wherein said first and second ramp transistors connect between the load voltage and the circuit voltage and wherein said first and second discharge transistors connect between the load voltage and ground and wherein said first and second discharge transistors have first and second gates, respectively, said first gate connected to receive the circuit voltage and said second gate connected to receive the enable signal.

10. The regulator of claim 3 wherein said first and second ramp transistors connect between the pump voltage and ground and wherein said first and second discharge transistors connect between the load voltage and ground and wherein said first and second discharge transistors have first and second gates, respectively, said first gate connected to receive the circuit voltage and said second gate connected to receive the enable signal.

11. The regulator of claim 3 wherein said first and second ramp transistors connect between the load voltage and the circuit voltage and wherein said first and second discharge transistors connect between the load voltage and ground and wherein said first and second discharge transistors have first and second gates, respectively, said first and second gates connected to receive the enable signal.

12. The regulator of claim 3 wherein said first and second ramp transistors connect between the load voltage and the circuit voltage and wherein said first and second discharge transistors connect between the load voltage and ground and wherein said first and second discharge transistors have first and second gates, respectively, said first and second gates connected to receive the enable signal.

13. A regulator for controlling a driving voltage including a pump voltage from a high-voltage pump and a regulated load voltage for a load, said regulator providing said load voltage as a rising load voltage during a rise time when said high-voltage pump is enabled by an enable signal and providing said load voltage as a falling load voltage during a fall time when said high-voltage pump is disabled by said enable signal comprising:
a switch connected between the load voltage and a circuit voltage and having a switch gate for receiving a switch gate signal for controlling conduction by said switch,
a control circuit for providing said switch gate signal, said control circuit including,
a ramp unit providing a ramp current for controlling the rising load voltage during said rise time, where said ramp unit includes source-drain connected first and second ramp transistors connected at a ramp node for conducting a ramp current where said second ramp transistor includes a ramp gate for controlling the ramp current through said first and second ramp transistors and where said first and second ramp transistors connect between the driving voltage and the circuit voltage, and where said ramp unit includes a capacitor-feed transistor having a source-drain connection to a capacitor node for conducting capacitor current for controlling the capacitor voltage stored on a capacitor, said capacitor node connected to said ramp gate for controlling the ramp current,
a discharge unit for controlling the falling load voltage during said fall time, said discharge unit including source-drain connected first and second discharge transistors, connected at a switch node, for conducting a discharge current where said switch node is connected to said switch gate and provides said switch gate signal for controlling conduction by said switch and where said first and second discharge transistors connect between the load voltage and a reference voltage and wherein said first and second discharge transistors have first and second gates, respectively, said first gate connected to receive a discharge gate voltage and said second gate connected to receive the enable signal,
wherein said discharge unit and said ramp unit operate independently to independently control the rising load voltage and the falling load voltage.

14. The regulator of claim 13 where said switch is a first p-channel MOSFET transistor having said switch gate and operating to conduct Icc current when ON and where said first discharge transistor is a second p-channel MOSFET transistor having a drain and operating to conduct discharge current Idis during discharging and wherein said first p-channel MOSFET transistor and the second p-channel MOSFET transistor are a cross-connected pair wherein the gate of the first p-channel MOSFET transistor is connected to the drain of the second p-channel MOSFET transistor whereby when one of the MOSFET transistors is ON the other of the MOSFET transistors is OFF and whereby Icc current and Idis current do not conduct at the same time.

15. The regulator of claim 13 wherein said first and second ramp transistors are first and second p-channel MOSFET transistors and wherein said capacitor-feed transistor is a p-channel MOSFET transistor where during the rise time, the driving voltage, Vdr, including the pump voltage, Vpump, the load voltage, Vpp, rise at the same rate as the capacitor voltage, Vpg.

16. The regulator of claim 15 wherein a voltage difference $\Delta V1$ between the driving voltage, Vdr, and the capacitor voltage, Vpg, is expressed as follows:

$$\Delta V1 = Vtp - [\{dVpg/dt\}\{C/(K \cdot S)\}]^{1/2}$$

where,
- Vtp=threshold voltage of capacitor-feed transistor
- C=capacitance of capacitor
- S=width to length ratio of capacitor-feed transistor
- K=transconductance parameter of capacitor-feed transistor
- dVpg/dt=ramping rate.

17. The regulator of claim 13 wherein said driving voltage is the pump voltage or the load voltage.

18. The regulator of claim 13 wherein said reference voltage is the circuit voltage or ground.

19. The regulator of claim 13 wherein said discharge gate voltage is the enable signal or the circuit voltage.

20. A method for processing regulator voltages, including a pump voltage from a high-voltage pump and a load voltage for a load, said pump voltage providing the load voltage as a rising load voltage during a rise time when said high-voltage pump is enabled by an enable signal and providing the load voltage as a falling load voltage during a fall time when said high-voltage pump is disabled by said enable signal, said method comprising:

- controlling conduction of a MOSFET transistor switch connected between the load voltage and a circuit voltage by applying a gate signal to a gate of the switch,
- generating the gate signal in a MOSFET control circuit where said MOSFET control circuit operates by,
  - providing a ramp current, Iramp, from a MOSFET ramp unit connected between a regulator voltage and ground for controlling the rising load voltage during said rise time,
  - providing a discharge current, Idis, from a MOSFET discharge unit connected between the load voltage and the circuit voltage for controlling the falling load voltage during said fall time and for providing said gate signal.

* * * * *